Oct. 24, 1961  J. A. R. KING  3,005,901
AUTOMATIC ARC-WELDING APPARATUS
Filed Sept. 16, 1959  4 Sheets-Sheet 1
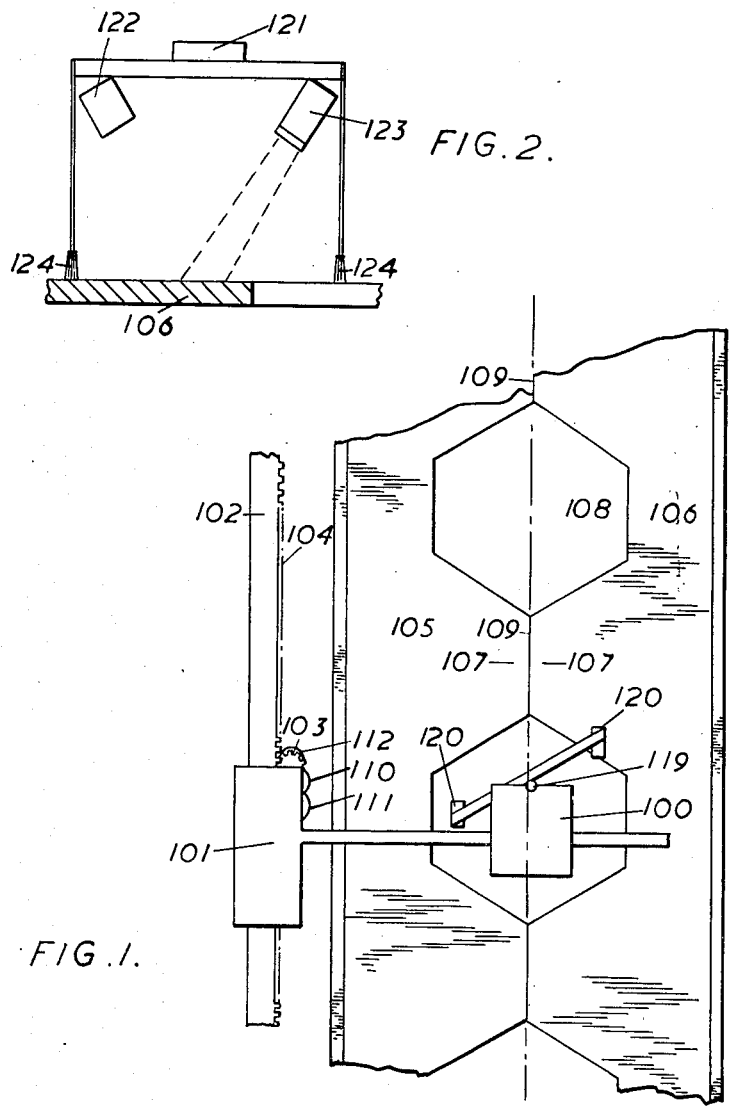
Inventor
JACK ASHER REUBEN KING
By
Aaron R. Townshend  Attorney

United States Patent Office 3,005,901
Patented Oct. 24, 1961

3,005,901
AUTOMATIC ARC-WELDING APPARATUS
Jack Asher Reuben King, Southport, England, assignor to The British Oxygen Company Limited, a company of Great Britain
Filed Sept. 16, 1959, Ser. No. 840,310
Claims priority, application Great Britain Sept. 17, 1958
3 Claims. (Cl. 219—125)

This invention relates to arc-welding apparatus in which a welding head and the work to be welded are caused to move relatively to each other by mechanical means, as distinct from manually, so that welding operations are carried out by apparatus which is to a great degree automatic.

The object of the present invention is to provide arc-welding apparatus which is automatic to a greater degree than has been attained hitherto.

According to the present invention, automatic arc-welding apparatus comprises means for effecting relative movement between a welding head and the work, a light source associated with the welding head, photo-electric means responsive to light reflected off the work from the light source for effecting automatic starting and stopping of the relative movement, and means for controlling the commencement and termination of arc-welding in predetermined relation to stopping and starting of the relative movement.

Also according to the present invention, automatic arc-welding apparatus comprises means for effecting relative movement between a welding head and the work either at welding speed or at a faster speed between successive welding operations, a light source associated with the welding head, photo-electric means responsive to light reflected off the work from the light source for effecting change-over from one speed to the other, and means for controlling the commencement and termination of arc-welding in predetermined relation to change-over from one speed to the other.

According to a further feature of the present invention, automatic arc-welding apparatus comprises means for effecting relative movement between a welding head and the work either at welding speed or at a faster speed between successive welding operations, a light source associated with the welding head, photo-electric means responsive to light reflected off the work from the light source for effecting change-over from one speed to the other, means for controlling the commencement and termination of arc welding in predetermined relation to change-over from one speed to the other, and means for halting the relative movement between the welding head and the work for a predetermined period at the time of a change-over from welding speed to the faster speed and for a predetermined period at the time of change-over from the faster speed to welding speed.

According to a further feature of the present invention, automatic arc-welding apparatus comprises means for effecting relative movement between a welding head and the work, a light source associated with the welding head, photo-electric means responsive to light reflected off the work from the light source for halting the relative movement between the welding head and the work when the welding head is positioned over the beginning of the joint, means for striking a welding-arc between a consumable electrode and a point of the work spaced a short distance from the beginning of the joint, means for feeding the consumable electrode from the welding head towards the work to maintain the welding-arc, means operative to cause resumption of relative movement at welding speed between the welding head and the work after a predetermined dwell period, said photo-electric means being responsive to light reflected off the work from the light source for halting the relative movement between the welding head and the work when the welding-arc reaches a point of the work spaced a short distance from the end of the joint, and means operative to terminate the feeding of the consumable electrode and to terminate the welding current subsequent to the welding of the relative movement near the end of the joint.

The photo-electric means may comprise one or more photo-electric cells responsive to the presence or absence of the work in relation thereto, or responsive to markings upon the work in relation thereto, or responsive to surface conditions of the work such as the presence or absence of powdered welding composition thereon or the difference between the reflectivity of machined and unmachined zones, the photo-electric means being responsive to changes of illumination thereof due to variations in, or the absence of, light reflected thereto by the work from an associated light source or sources.

The welding head may be moved relatively to the work by two electric motors, the photo-electric means operating to effect change-over of the drive from one motor to the other motor. Both motors may drive the head at welding speed e.g. where there is little space between workpieces, but one motor may drive the head at welding speed and the other drive it at a faster speed than welding speed between successive spaced welding operations, so that the welding head moves relatively rapidly from one workpiece to another, or from one welding zone to another on the same workpiece.

A single photo-electric cell may effect the change-over of the drive from one motor to the other, the amplified output from the cell being utilised to operate a relay which controls the drive from the motors.

Alternatively the photo-electric means may comprise two photo-electric cells located one behind the other relative to the direction of movement of the welding head.

Switching means may be arranged to apply the outputs of the photo-electric cells to a control circuit for the apparatus in accordance with the direction of movement of the welding head whereby certain control functions are always effected by the leading photo-electric cell and other control functions are effected by the trailing photo-electric cell.

In either arrangement the respective motor drive control circuits may each incorporate a delay device, so that when a photo-electric cell effects a change-over from one motor to the other, the movement of the welding head ceases for a predetermined period at the time of change-over. In the case of welding by consumable electrode processes, this provides a dwell period at the commencement of a welding operation during which the arc can be struck automatically, e.g. by high frequency initiation or by controlling the commencement of electrode feed automatically upon change-over from one motor to the other, or by other methods. Similarly a dwell period occurs at the end of a welding operation, during which electrode feed is stopped automatically upon change-over from one motor to the other and the arc extinguishes due to burning back of the electrode. In the case of welding by non-consumable electrode processes, the dwell period at change-over from one motor to the other provides for striking of the arc by high frequency initiation, and the arc extinguishes at the end of a welding operation when movement commences, and in both cases, if desirable the dwell periods may be extended to allow weld pools to form and spill at both ends of a welding run. Thus means are provided for controlling the commencement and termination of arc welding in predetermined relation to change-over from one motor to the other, with or without change of speed.

It will be appreciated that the invention provides arc-welding apparatus which can either move at welding speed between close successive welding runs or move rapidly between successive spaced welding runs, and at normal welding speed during a welding run, and that the arc will strike and extinguish automatically, as required, all under the control of the photo-electric means.

One construction of arc-welding apparatus in accordance with the present invention will now be described by way of example with reference to the accompanying diagrammatic drawings in which:

FIGURE 1 is a plan view of the nozzle of a welding head and associated photo-electric devices shown in position for welding a castellated beam;

FIGURE 2 is a side elevation of one of the photo-electric devices seen in FIGURE 1;

Figure 3:
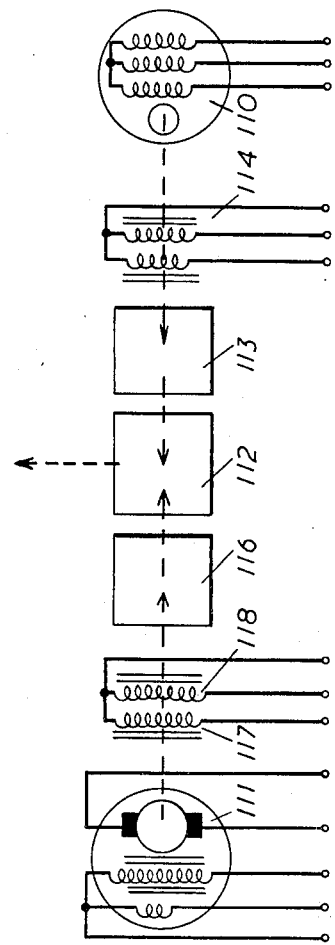
FIGURE 3 is a diagram of the mode of connection of the driving motors and FIGURES 3 and 4 are diagrams of the control circuit of the apparatus.

Referring to FIGURES 1 and 2 of the drawings, the apparatus includes a welding head 100 which is mounted on a carriage 101 for longitudinal and transverse movement relative to a track or guideway 102. A workpiece 103 to be welded is supported below the welding head 100 and parallel to the track or guideway 102. In this particular application the workpiece 103 consists of a beam which has been cut along its web to produce two castellated sections 105 and 106. After cutting, the sections 105 and 106 are separated and displaced longitudinally so that the prominances 107 of the two sets of castellations abut one another and the indentations are separated by openings 108. The apparatus is arranged to weld together the abutting prominances of the two sets of castellations, and it will be seen that this involves welding a succession of relatively short spaced joints 109 which extend in line along the beam.

Weld metal is deposited in the joints 109 from a welding electrode which is automatically fed towards the work through a nozzle 110 mounted on the welding head 100.

Movement of the welding head 100 along the track or guideway 102 is effected by a driving pinion 103 in mesh with a rack 104, the pinion 103 being rotated by one or other of two electric motors 110 and 111, see FIGURE 3, via a differential gear 112 to which the motors are coupled.

During operation, the motors 110 and 110 run continuously and are each coupled to the differential gear 112 by way of an electromagnetically operated clutch and brake and reduction gear box. Fixed speed motor 110 is associated with gear box 113, clutch 114, and brake 115, and variable speed motor 111 is associated with gear box 116, clutch 117 and brake 118. Control of these motors is effected by a control circuit which is shown in FIGURES 4 and 5 and which also controls the welding head 100.

A photo-electric device 120 is mounted at each side of the welding head 100 on a bracket 121, one device being in advance of the other. Each device 120 comprises a photo-electric cell 122 disposed to receive light reflected from the upper surface of the work from a spot lamp 123. Brushes 124 carried ahead of and behind the photo-electric cell 122 and spot lamp 123 clear the surface of the work of loose material that might interfere with the control system by affecting the reflection of light from the spot lamp. It will be noted that the photo-electric cells are not disposed over the joint but are responsive to changes of intensity of reflected light from the work. If the welding operation involves the use of a granulated welding composition then flux dams should be used to prevent the composition being deposited on the surface viewed by the photo-electric cells.

Figure 4:
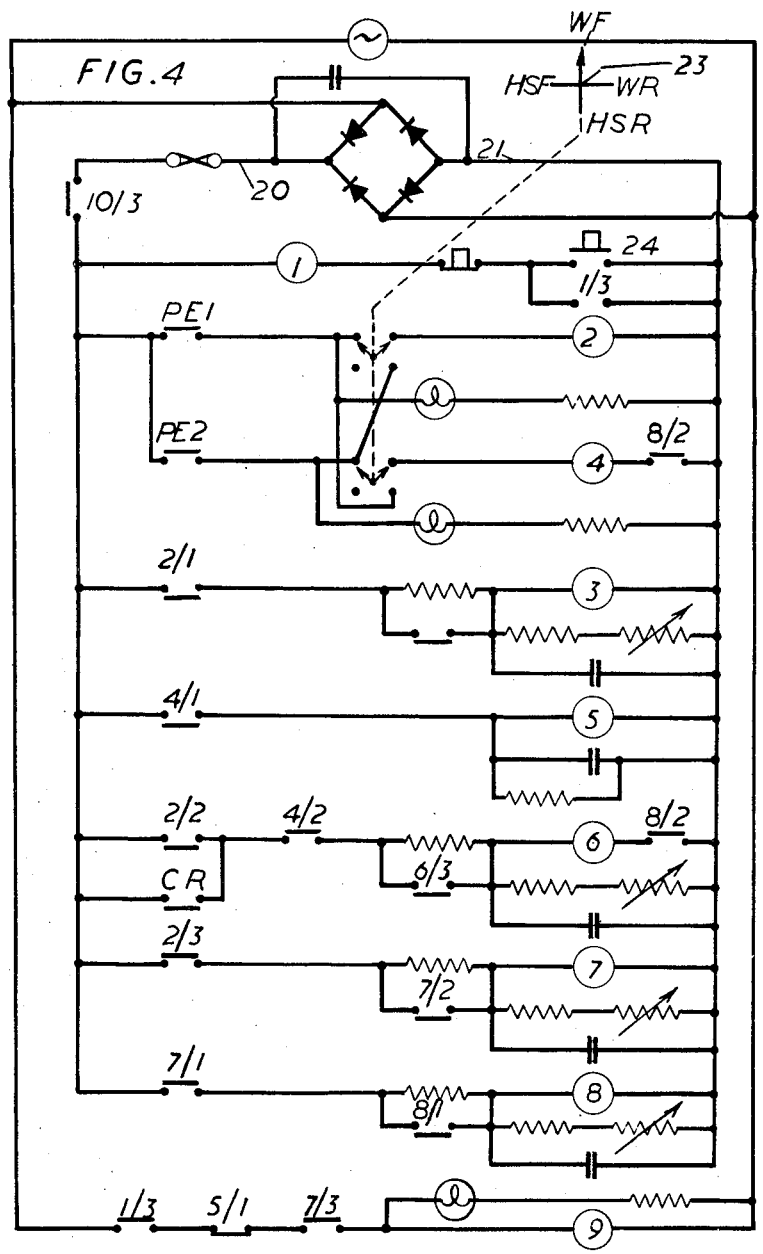
Figure 5:
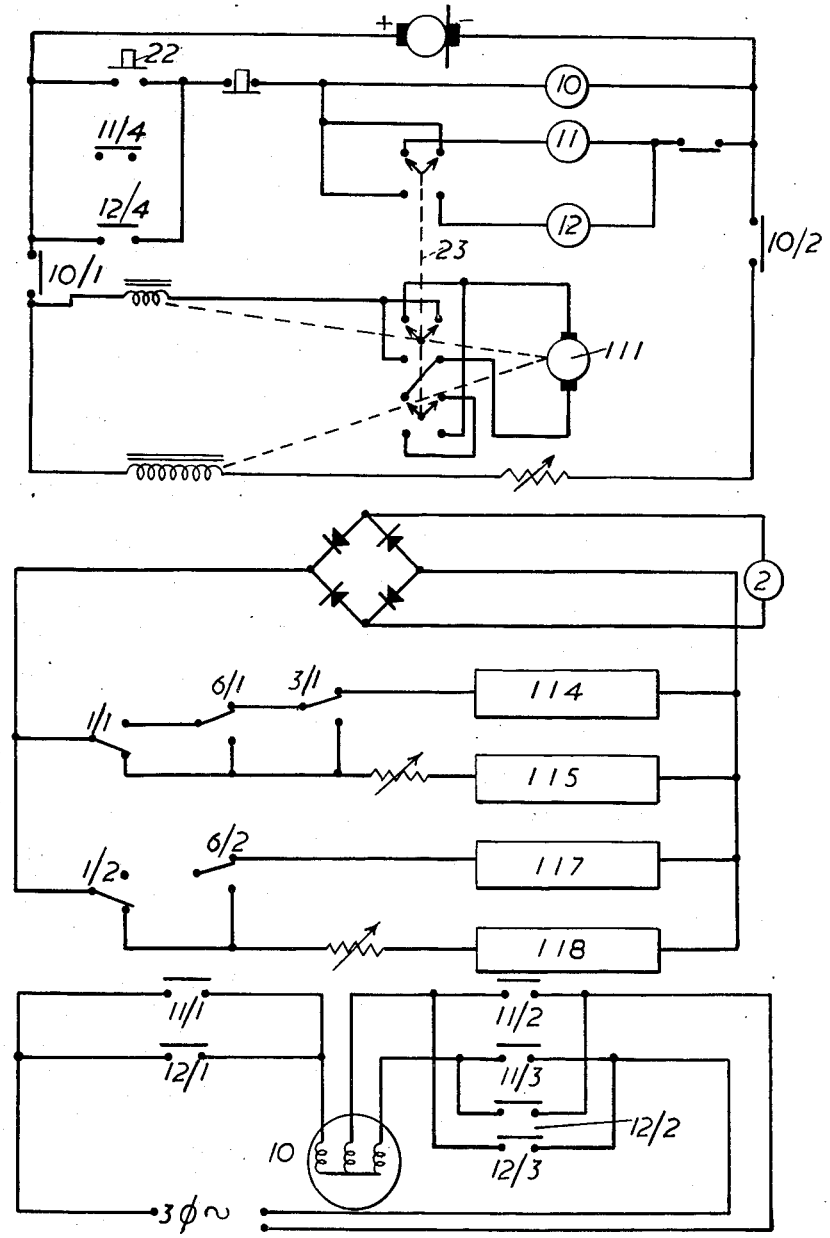

Referring to the circuit diagram of FIGURES 4 and 5 a D.C. voltage is applied to the conductors 20 and 21. Closure of motor start switch 22 in FIGURE 5 by an operator allows energisation of relay 10 and energisation of relay 11 or relay 12 depending upon the position of the traversing selector 23 contacts of which are shown in both circuit diagrams. As shown the traversing selector is shown in position for welding to be carried out in the forward direction along the track or guideway 102. Rotating the control of the traversing selector 23 in a clockwise sense enables three other settings to be obtained in the order, "weld in reverse directions," "high speed reverse," and "high speed forward." Relays 10, 11 and 12 operate through their contacts 10/1, 10/2, 11/1, 11/2, 11/3, 11/4, 12/1 and 12/2 to connect variable speed motor 111 and fixed speed motor 110 to their sources of power supply. As will be seen from FIGURE 5, the clutches and brakes for motors 110 and 111 are not energised at this stage.

A "start weld" switch 24 is closed by operator when the welding operation is to be started, and this allows energisation of relay 1. Closure of contacts 1/1 in FIGURE 5 energises the variable speed clutch 117 associated with motor 111 and movement of the welding head commences. Relay 3 is also energised and contacts 3/1 in FIGURE 5 cause application of brake 115 to motor 110. When the leading photo-electric cell receives reflected light from the surface of the workpiece it produces a signal voltage which is amplified and applied to a relay not shown, thereby closing contacts PE1. Relay 2 is then energised and its contacts 2/1 open. Relay 3 is still energised by its associated circuit however and the welding head moves forward at slow speed. Contacts 2/3 close to allow energisation of relay 7 which in turn closes contacts 7/1 and allows energisation of relay 8. Both relays 7 and 8 are associated time delay circuits.

As the trailing photo-electric cell receives reflected light from the workpiece the contacts PE2 are closed by an associated relay, not shown, which in turn allows energisation of relay 4. Closure of contacts 4/2 allows energisation of relay 6; and contacts 6/1 and 6/2 shown in FIGURE 5 are operated to energise the brakes 115 and 119 thereby stopping the nozzle 110 over the joint 109 and spaced a short distance from the end of this joint. Relay 5 is de-energised by closure of contacts 4/1 and this is arranged to initiate a welding arc between the work and the tip of a wire electrode fed through the nozzle 110. Feeding of this wire is controlled by relay 9 which is energised on closure of contacts 7/3.

When welding current flows, the contacts CR/1 of a current relay, not shown, are arranged to open, and this permits relay 6 to de-energise after a predetermined time delay. Contacts 6/2 are thereby operated to connect the variable speed motor 111 to the differential gear 112 at the end of the predetermined dwell period and drive the welding head forward at welding speed. When the leading photo-electric cell moves clear of the work the relay 2 is de-energised and, its contacts 2/2 close to de-energise relay 6 with resultant operation of contacts 6/1 and 6/2 and application of brakes 115 and 119 to stop the welding head. This stopping is arranged to occur with the nozzle 110 not quite at the end of the joint 109. Opening of contacts 2/3 allows relay 7 to de-energise, after a time delay. Thus wire feed and welding current are maintained in known manner for crater-filling at the end of the weld. The wire feed relay 9 and "burn off" relay 8 are also de-energised by opening of the contacts of relay 7, and these relays respectively then terminate te wire feed at a suitable instant, and subsequently the welding current.

Relay 4 is de-energised on opening of the contacts of relay 3 at the end of the dwell period, and with all relays shown in FIGURES 4 and 5 de-energised the welding head then moves forward at high speed towards the next joint where the procedure is repeated. In some applications it will not be necessary for the welding head to move at high speed between the joints but in all cases it is desirable to provide a dwell period at the beginning and end of each joint.

It will be appreciated that besides detecting the actual presence or absence of the work, so as to carry out automatic welding of successive workpieces, the photo-electric means can be arranged to be sensitive to different zones on the same workpiece by marking the work or conditioning it in some way, for example by suitably marking or depositing powdered welding composition at zones requiring to be welded and arranging that the photo-electric means cause welding runs to be effected only where powder is deposited or markings are made.

It will be appreciated that one or more welding heads could be mounted on a single movable carriage which also carries the photo-electric cell or cells, so that several parallel weld runs could be made simultaneously.

I claim:

1. Automatic arc-welding apparatus comprising means for effecting relative movement between a welding head and the work, a light source associated with the welding head, photo-electric means responsive to light reflected off the work from the light source for effecting automatic starting and stopping of the relative movement, and means for controlling the commencement and termination of arc welding in predetermined relation to stopping and starting of the relative movement.

2. Automatic arc-welding apparatus comprising means for effecting relative movement between a welding head and the work either at welding speed or at a faster speed between successive welding operations, a light source associated with the welding head, photo-electric means responsive to light reflected off the work from the light source for effecting change-over from one speed to the other, means for controlling the commencement and termination of arc welding in predetermined relation to change-over from one speed to the other, and means for halting the relative movement between the welding head and the work for a predetermined period at the time of a change-over from welding speed to the faster speed and for a predetermined period at the time of change-over from the faster speed to welding speed.

3. Automatic arc-welding apparatus comprising means for effecting relative movement between a welding head and the work, a light source associated with the welding head, photo-electric means responsive to light reflected off the work from the light source for halting the relative movement between the welding head and the work when the welding head is positioned over the beginning of the joint, means for striking a welding-arc between a consumable electrode and a point of the work spaced a short distance from the beginning of the joint, means for feeding the consumable electrode from the welding head towards the work to maintain the welding-arc means operative to cause resumption of relative movement at welding speed between the welding head and the work after a predetermined dwell period, said photo-electric means being responsive to light reflected off the work from the light source for halting the relative movement between the welding head and the work when the welding-arc reaches a point of the work spaced a short distance from the end of the joint, and means operative to terminate the feeding of the consumable electrode and to terminate the welding current subsequent to the halting of the relative movement near the end of the joint.

References Cited in the file of this patent

UNITED STATES PATENTS

| | | |
|---|---|---|
| 1,831,343 | Caldwell | Nov. 10, 1931 |
| 2,031,288 | Tripp | Feb. 18, 1936 |